United States Patent
Berube et al.

[19]

[11] Patent Number: 6,131,441
[45] Date of Patent: *Oct. 17, 2000

[54] APPARATUS AND METHOD FOR ISOLATING OR TESTING A PIPE SEGMENT

[76] Inventors: Guy Berube, 880 Guthrie Drive, Sarnia, ON, Canada, N7V 1Y3; Glenn Carson, 1362 Cathcart Boulevard, Sarnia, ON, Canada, N7S 2V2

[*] Notice: This patent is subject to a terminal disclaimer.

[21] Appl. No.: 09/159,226

[22] Filed: Sep. 23, 1998

Related U.S. Application Data

[63] Continuation-in-part of application No. 08/759,311, Dec. 2, 1996, Pat. No. 5,844,127.

[51] Int. Cl.⁷ .............................. G01M 3/04; F16L 55/10
[52] U.S. Cl. ................................. 73/49.8; 73/46; 138/89
[58] Field of Search ............................ 73/40.5, 46, 49.1, 73/49.5, 49.6, 49.8; 138/90, 93

[56] References Cited

U.S. PATENT DOCUMENTS

| | | |
|---|---|---|
| 1,710,439 | 4/1929 | Taylor . |
| 1,710,739 | 4/1929 | Taylor ........................................ 138/90 |
| 1,757,724 | 5/1930 | Larson ....................................... 138/90 |
| 1,841,974 | 1/1932 | Naylor ....................................... 138/90 |
| 2,155,602 | 4/1939 | Keulers . |
| 2,241,525 | 5/1941 | Rosenkranz ............................... 138/90 |
| 2,241,526 | 5/1941 | Rosenkranz . |
| 2,342,616 | 2/1944 | O'Brien . |
| 2,443,944 | 6/1948 | Bean . |
| 2,873,764 | 2/1959 | Lombard et al. . |
| 3,071,960 | 1/1963 | Knapp et al. ............................... 73/40.5 |
| 3,338,088 | 8/1967 | Smith et al. ................................. 74/46 |
| 3,434,337 | 3/1969 | Goeke ........................................ 73/49.8 |
| 3,483,894 | 12/1969 | Finocchiaro ............................... 138/90 |
| 3,503,249 | 3/1970 | Dumond .................................... 73/49.1 |
| 3,583,239 | 6/1971 | Paine ......................................... 73/49.8 |
| 3,712,115 | 1/1973 | Miller ........................................ 138/90 |
| 3,803,901 | 4/1974 | McConnell et al. . |
| 4,083,230 | 4/1978 | Rome et al. ............................... 73/40.5 R |
| 4,192,177 | 3/1980 | Crickard et al. ........................... 73/49.5 |
| 4,381,800 | 5/1983 | Leslie ........................................ 138/90 |
| 4,429,588 | 2/1984 | Arnell et al. ............................... 73/40.7 |
| 4,574,618 | 3/1986 | Anthony et al. ........................... 73/40.5 R |
| 4,753,108 | 6/1988 | Jansch . |
| 5,204,079 | 4/1993 | Dufort ....................................... 73/49.8 |
| 5,307,841 | 5/1994 | Condon ..................................... 138/90 |

FOREIGN PATENT DOCUMENTS

| | | |
|---|---|---|
| 1049124 | 1/1959 | Germany . |
| 1813589 | 6/1970 | Germany . |
| 329401 | 5/1930 | United Kingdom . |
| 826429 | 5/1957 | United Kingdom ................... 138/90 |
| 826429 | 1/1960 | United Kingdom . |

*Primary Examiner*—Hezron Williams
*Assistant Examiner*—Jay L. Politzer
*Attorney, Agent, or Firm*—Santosh K. Chari; Orange & Chari

[57] ABSTRACT

A test plug assembly which tests the integrity of a segment of pipe having an internal diameter. The assembly comprises an annular body with opposite annular faces and defining on its outer perimeter, an annular recess, a pair of bosses, a pair of resilient annular members adapted to be respectively juxtaposed between an adjacent boss and annular face, means for urging the bosses respectively against the adjacent resilient annular member so as to urge the same frictionally engage and to seal against the internal diameter of the selected pipe segment and, means communicating through the assembly to that plenum now defined by said recess, the resilient annular members and the internal diameter of the pipe whereby the integrity of that pipe segment may be determined.

11 Claims, 14 Drawing Sheets

APPARATUS AND METHOD FOR ISOLATING OR TESTING A PIPE SEGMENT

This is a Continuation in Part of application Ser. No. 08/759,311, filed Dec. 2, 1996, U.S. Pat. No. 5,844,127.

This invention relates to a test plug for pipes.

BACKGROUND TO THE INVENTION

In the fabrication of fluid flow systems, whether they be for the purposes of conveying liquid such as petrochemicals, or gases such as natural gas, or even fluidized cereals as is common in the cereal processing industry, the use of conduits or pipes is common and replete. From a fabrication point of view, pipes can only be manufactured to a finite length and therefore, various lengths or elbows must be connected together in order to structure the conduit fluid conveyance means. This is accomplished by welding butt ends of pipes together or to elbows etc., or alternatively, to weld the end of a pipe to a butt flange and to juxtapose two butt flanges together by means commonly known, for example, use of bolts through each juxtaposed annular portions of each butt flange. Generally, such flanges co-operatively employ gaskets as sealing elements.

It is increasingly desired to have these welds tested for the purposes of determining whether there is any leakage. Particularly, in the petrochemical industry, it is now being mandated that the amount of fluid evaporating or escaping from any weld or flange/flange interface be reduced to allowable limits which, up to now, have been about 2 liters per annum to less than a ¼ of a liter per annum per flange/flange or weld interface. When one considers that in petrochemical plants there are thousands of such welds or butt flanges, the task of testing each of them becomes onerous and costly.

THE INVENTION

We have conceived a simplified test plug which is used to test pipes, with an internal diameter of approximately ½ inch (1.75 cm) and with modification to as great as what is desired, say even 6 to 10 feet (300 cm), or more.

It is an object of the invention to provide a simplified test plug which can be hand carried by one or two workers, assembled within the diameter of a pipe to be tested, temporarily sealed therein so as to allow a testing step to take place which tests the integrity between an annular pipe segment and the test plug, the annular pipe segment generally including a welding interface or a flange interface, or other surface, in order to determine if this region leaks at all, and if it does, to what extent.

The invention therefore contemplates a test plug assembly for testing the internal integrity of a segment of pipe having an internal diameter, the assembly comprising (a) an annular body with opposite annular faces and defining on its outer perimeter, a peripheral recess, (b) a pair of bosses (c) a pair of resilient annular members adapted to be respectively juxtaposed between a boss and an annular faces, (d) means for urging the bosses respectively against an adjacent resilient annular member go as to cause the same to frictionally engage and to seal against a boss, and its adjacent annular face, and the internal diameter of the pipe segment, and, (e) means communicating through the assembly to that plenum now defined by said recess, the annular members, and the internal diameter of the pipe, whereby the integrity of the pipe segment may be determined. Particularly, the urging means (d) is a shaft which extends between said bosses, preferably with one of the bosses being integral to the shaft, the opposite end of the shaft being threaded so as to provide means for urging the resilient annular members, respectively between an adjacent annular face and boss in order to seal the diameter of the pipe, there to define the plenum. In one embodiment, the communicating means (e) communicates through the shaft from its threaded end and provides communication means to the recess in the annular body, which preferably is a peripheral annular recess or race.

In another embodiment, there may be a pair of communicating means to the peripheral annular recess defined by the annulus and the urging means being a plurality of axially oriented circumferentially disposed bolts, in which case each boss may be an annulus. In order to further reduce weight, the annulus may be aluminum wherein the outer annular recess is milled from cylindrical aluminum stock; and the bosses, fabricated either from steel or aluminum solid rod or square stock and appropriately milled.

In above noted embodiments, the hydrostatic testing media is a fluid-like liquid, preferably water, which is inserted into the plug after its sealing engagement within and communicating with the inner diameter of that selected pipe space which now defines the testing plenum is itself defined by the plug and the internal pipe space diameter. Into the testing plenum, the testing media is flowed, via conduits through the plug; then, pressurized to test the integrity of that portion of the pipe that is in juxtaposed communication with the hydrostatically filled testing plenum.

In a variation of the aforesaid embodiments, the "test plug" is also an isolating-monitoring plug; namely, one that isolates pipe space from a region or interface while allowing monitoring of that pipe space on the obverse side to the test-isolation monitoring plug from that pipe interface that is to be either tested, or to which a weld is to take place, for instance, the creation of a pipe-weld-pipe interface or a pipe-weld-flange interface or any other similar interface that is to be tested.

In its broadest application, the invention contemplates a method of testing the internal integrity of a pipe segment having an internal wall defining an internal bore having an internal bore diameter comprising the steps of (a), selecting a resilient annular member having an outer diameter less than the internal bore diameter, two bosses, each with an outer diameter less than the internal bore diameter, at least one being a disk (b), positioning, within the internal bore, the bosses on opposite sides of the resilient annular member (c), moving the bosses, relatively closer to each other to compress the resilient member therebetween into sealing engagement with the internal wall of the pipe and (d), conveying a fluid into the internal bore and against a boss to test the internal integrity of that pipe segment, juxtaposed therewith. Particularly, and in the preferred embodiment, the method of testing comprises the steps of (a), selecting an annular body with an inner annular diameter and outer annular diameter that is less than the internal bore diameter, the body having an outer peripheral race of diameter less than the outer annular diameter, two resilient annular members, each respectively having an outer diameter greater than the outer annular diameter and an inner diameter less than the outer annular diameter, two bosses; each with an outer diameter less than the internal bore diameter (b), positioning, at opposite ends of the annular body, one of the resilient annular members, then a boss (c), moving the bosses, relatively closer to each other to compress the resilient member adjacent thereto into sealing engagement among the annular member and the internal wall to thereby define an annular space among the outer peripheral race, its adjacent communicating internal wall of the pipe segment, and the annular resilient members and (d), conveying a fluid through the annular space thereby to test the internal integrity of the pipe segment communicating therewith. Either one or two annular bosses may be selected, if one, the opposite boss is a disk boss with front and obverse faces and, when the diameter is quite large, the disk boss may be supported on its obverse face.

DESCRIPTION OF THE DRAWINGS

The invention will now be described by way of example and with reference to the accompanying drawings:

Referring to FIGS. 1 and 2, one embodiment of test plug is generally shown as (10) and is suitable for testing the integrity of a welded discontinuity (30) like a flange (31)-weld (30)-pipe (32) interface. The flange (31) generally is a standard butt flange, as will be apparent hereafter, while the pipe or conduit (32) is generally of a diameter up to approximately 18" (82.3 cm). The welded discontinuity (30), is a weld which holds the flange (31) to the end of the pipe (32) so that a corresponding flange of a next pipe run may be bolted thereto each butt annular surface (33) of each flange (31) juxtaposed. Initially, it is the weld interface (30) whose integrity is to be determined; whether or not there are unseen fissures or apertures which may allow leakage of a fluid which will pass through the conduit (32) when in application as in the petrochemical environment or otherwise. A bolted flange-flange interface could similarly be tested, as could any other pipe discontinuity.

Figure 1:
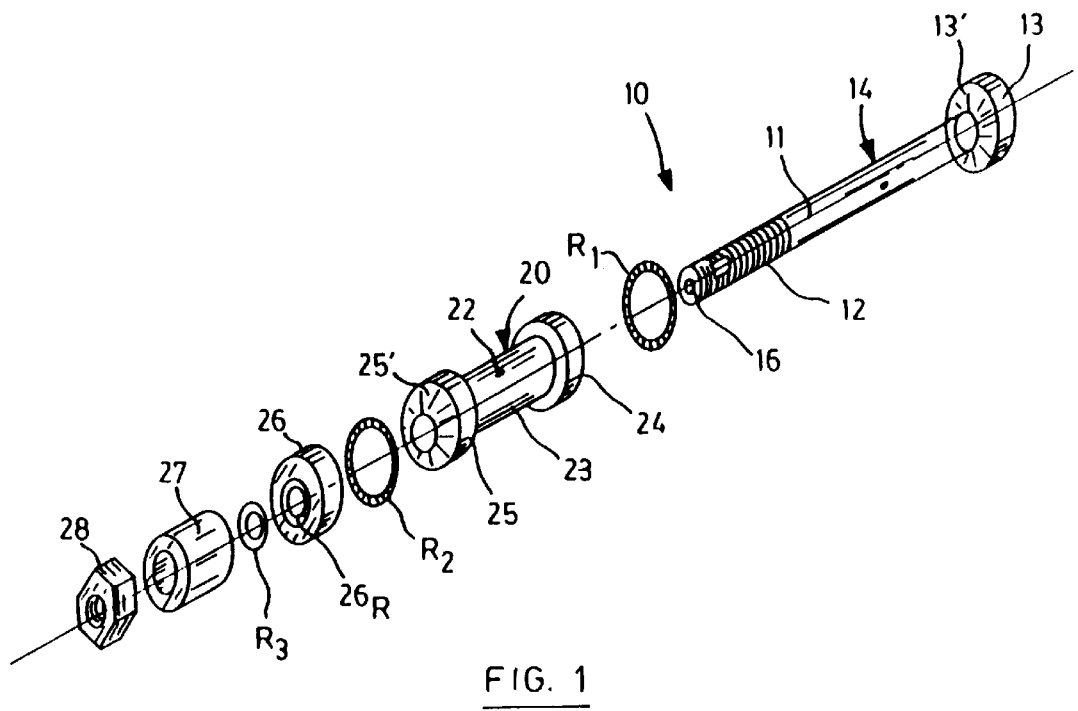
FIG. 1 is an assembly perspective view of a test plug, according to the invention, particularly suited for pipe diameters up to 3.511 (8.9 cm), approximately.

In the first embodiment, the plug (10) includes a cylindrical shaft (11) that at one end has a threaded shank (12) and at the other end, an integral boss, plug or disk (13) so as to form an integral shaft component (14); the disk (13) has an inner bevelled or truncated cone-like peripheral surface (13'), as shown. The shaft (11) defines an internal bore (15) communicating with a flaring outer or distal end (16) that acts as an attachment means to communicate the bore to a water pressure source that, during testing, acts as a pressure media as will be explained. The bore (15) extends approximately midway into and along the longitudinal axis of the shaft (11), as more clearly seen in phantom in FIG. 2 and in the cross section FIG. 2B, and communicates with diametrically oriented channels (17), which communicate to the outside diameter surface of the shaft (11)—see FIG. 2B.

Figure 2:
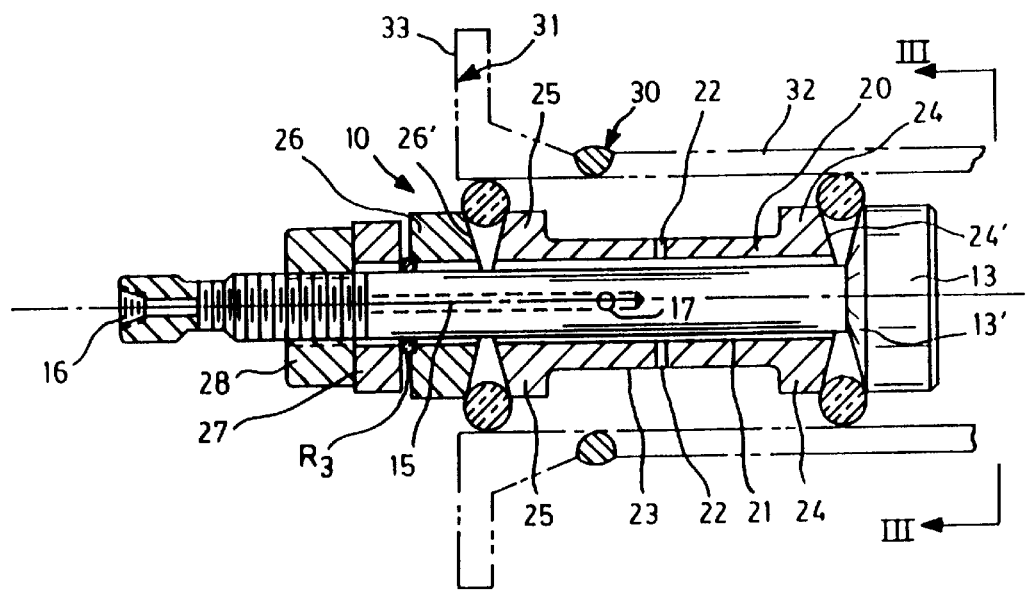
FIG. 2 is a sectional view in preliminary application of the plug of FIG. 1 into a butt flange pipe weld interface, the integrity of which is to be tested.

The shaft (11) is adapted to pass through an annular piece, sometimes referred to as the annulus, generally referenced as (20) having an internal bore (21) sized larger than the external diameter of the shaft (11) and having at least a radial bore, shown in FIGS. 1 and 2 as two radially oppositely disposed channels (22) that communicate between a stepped annular recess (23) exteriorly circumscribing the center portion of the annulus (20) with the inner bore (21). The opposite ends of the annulus (20) are integral radially protruding disks (24) and (25), with their respective outer truncated annular surfaces (24') and (25') being bevelled inwardly from center to perimeter.

Figure 2A:
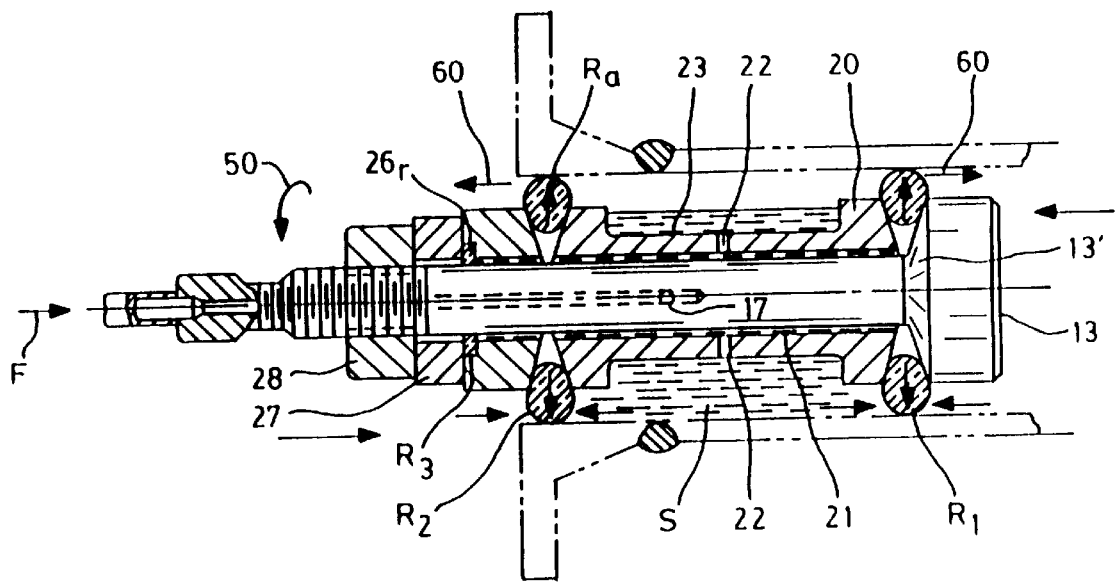
FIG. 2A is the same as FIG. 2 showing the fitting of the plug in sealed position.
Figure 2B:
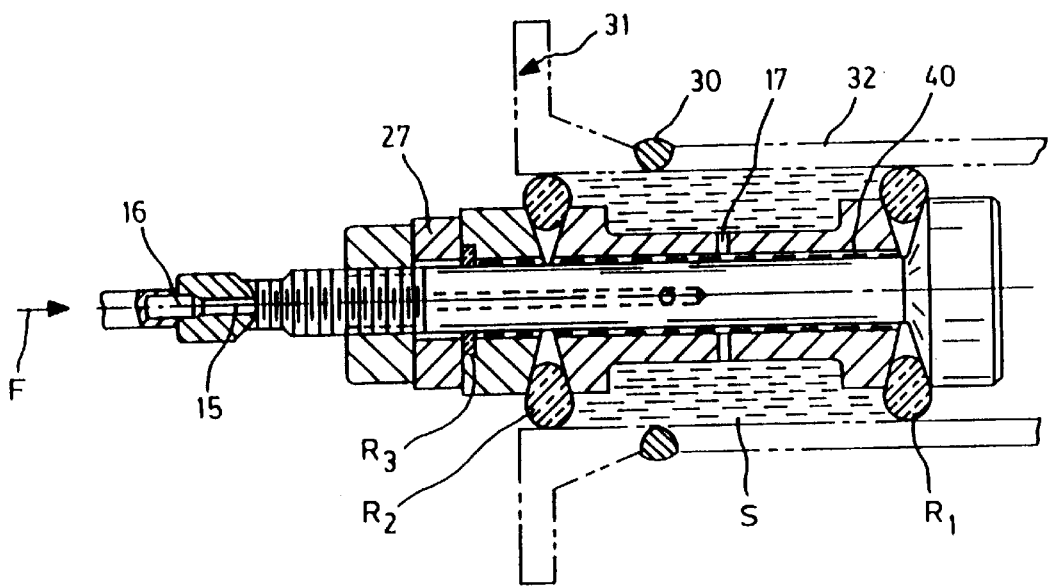
FIG. 2B is an orthogonal cross-section to that of FIG. 2 and 2A further showing testing.

In order to complete the other rigid components of the plug (10), there is an annulus (26) whose inner bore is larger than the outer diameter of the threaded shaft (12) so as to accommodate its passing therethrough with space, the annulus having an interface (26') as a reversibly bevelled annular conical surface, and its outerface, preferably orthogonal to the longitudinal axis of the bore, yet having a stepped bore of slightly larger diameter at the interface between this space and the inner bore of the annulus so as to define a channelled race (26) which accommodates a smaller elastomeric ring ($R_1$), as will be explained. The obverse surface (26') is a reversibly bevelled annular conical surface, which might also be "truncated", as are clearly seen in FIGS. 2, 2A and 2B.

A second boss in the form of an annular collar (27) has its inner bore sized to accommodate the threaded shaft, to mate with a threaded nut (28) which is adapted to thread onto the shaft and to compress all the components of the plug referred above into one integral unit. In order to provide annular sealing between juxtaposed bevelled surfaces (13') and (24'), there is an elastomeric annular ring ($R_1$); similarly, there is an elastomeric annular ring ($R_2$) juxtaposed between truncated conical annular surfaces (25') and (26'), an elastomeric annular seal ($R_1$) which nests into the annular race (26). The inner diameter of the annular race is sized to frictionally engage the outer diameter of the shaft (11) so as to provide a sealing fit as will be explained.

In order to insert the assembled plug (10) into the pipe interface so as to test the integrity of the internal diameter of the interface (30), and now referencing FIG. 2, the assembled plug in its relaxed mode is placed into the pipe flange with the interface (30) occupying or communicating with the area defined by the annular recess (23). The nut (28) is turned down, as shown by the arrow in FIG. 2A, and the respective annular bevels (13') and (24') forced into closer proximity; and similarly, with juxtaposed bevels (25') and (26'), respectively forcing the respective annular rings ($R_1$) and ($R_2$) outward in the direction of their respective arrows (Ra). At the same time, fluid in the direction of the arrow (F), floods the bore (15), the oppositely disposed radial channels (17) communicating water flow into the foreshaft regions referenced (40) in FIG. 2B, out the radial channel (22) of the annulus (20) so as to flood the annular space (S) defined by the plug (10) in the internal diameter of the pipe flange interface. Some of the fluid would escape, flowing in the direction of arrows (60) during initial purging of any air within the space or plenum (S) while the nut (28) is turned down in the direction of the arrow (50) eventually sealing with the space (S). The annular ring ($R_3$) isolated the annular space (S) between the internal bore (21) and the outside shaft diameter (11) so as to create a watertight environment.

Additional water pressure is applied so as to increase the pressure of water within space (S). The pressure of water within space (S) can be measured by a hydrostatic device, not shown, while observing the outside of the weld interface (30) to see whether any leakage occurs.

Figure 3:
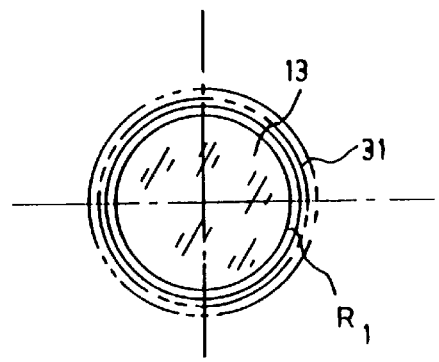
FIG. 3 is a cross section along lines III—III of FIG. 2.
Figure 4:
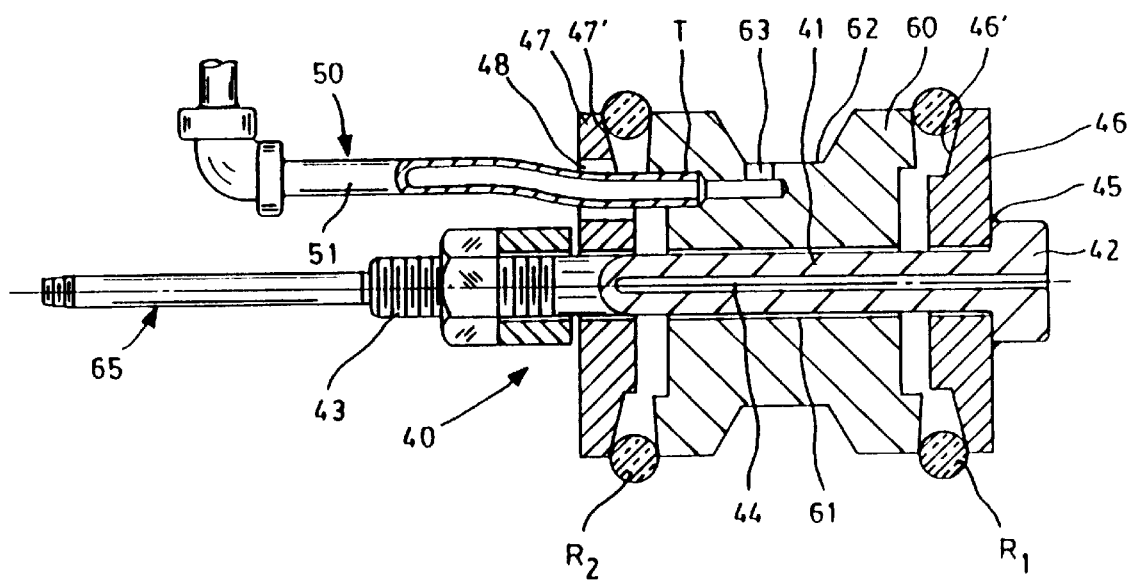
FIG. 4 is a partially axially cross-sectional view of an alternative embodiment of pipe plug with venting, particularly suitable for larger diameter pipes of up to about 811 (125 cm)
Figure 5:
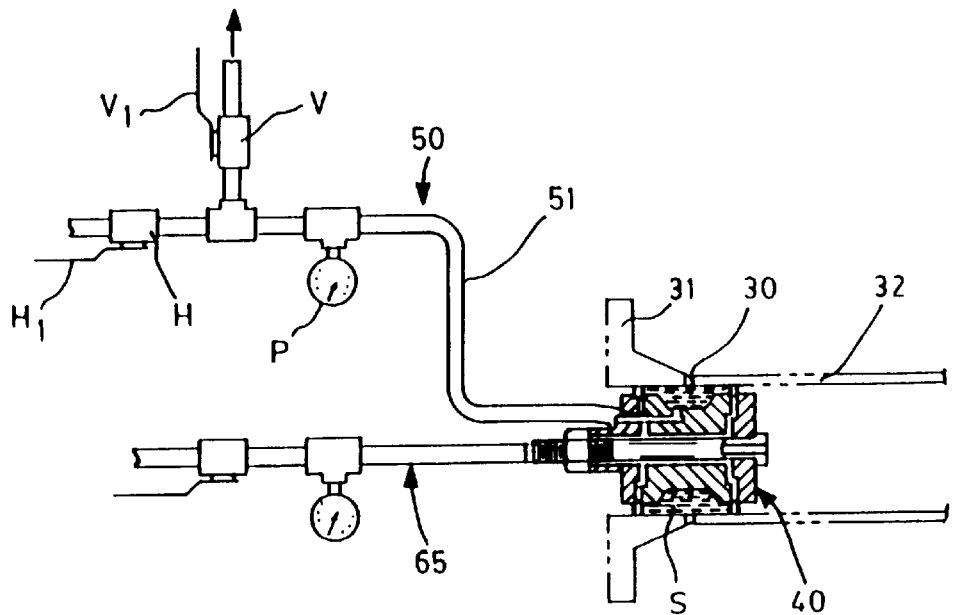
FIG. 5 is a partial section illustrative of the testing sequence for testing the integrity of the pipe flange welded interface.

In the embodiment of FIGS. 4 and 5, which is particularly suitable for internal pipe diameters up to approximately 125 cm because test plugs with larger diameter than about 9 cm, FIGS. 1 through 3, become too heavy for workmen to carry thus, the same consists of a shaft (41) having an external end boss or disk (42) at one end and a threaded portion (43) at the opposite end, the shaft and disk defining a central bore (44). The disk (42) is welded at (45) to an annular end disk plate (46) whose inner margin (46') is a bevelled annulus to accommodate "O" ring ($R_1$). There is an opposite annular end disk (47) with a similar inner annular bevel (47') to accommodate annular ring ($R_1$) but the disk (47) also has an aperture therethrough (48) which allows passage of a hydrostatic flooding and testing circuit, generally shown as (50) to extend therethrough. The plug (40) includes an annular piece (60) defining an inner bore (61) which accommodates the shaft (41) and an outside circumferential race (62), which includes a hydrostatic filling channel (63) communicating with the testing circuit (50) in the fashion shown. As such, the circuit (50) has a threaded hose (51) whose distal end threads into and sealingly mates with a corresponding thread (T) defined by the outer extremity of the bore (63) to make a fluid channel passing through the disk (47) and communicating with the race (62). The bore (44) acts as a venting channel to allow venting of the internal pipe (32) when the plug (40) is being inserted into the flanged pipe bounded by the peripheral weld (30) which is put in place to sealingly attach one to the other—see FIG. 5. It may also be an advantage to conduct a second testing circuit which is referenced (65) to test everything that is to the right of the plug (40), as shown in that figure. Thus, the same bore (44) serves to vent the interior of the pipe (33) during insertion and removal of the plug (40) or, alternatively, accommodates a second circuit for testing the interior of the pipe (32), if required, by utilizing testing circuit (65).

If the space (S) which is bounded by the plug (40) and the internal pipe (32) flange (31) and circumferential weld (30) is to be tested, then preferably threaded hose (51) is positioned so as to be vertical over the bore (44) and the testing circuit (50) includes a hydrostatic pressure gauge (P) communicating with the hose (51), a venting valve (V) having a switch ($V_1$), and a hydraulic fluid control valve (H) with its corresponding switch ($H_1$). Water is periodically allowed to flow through valve (H) into space (S) by opening ($H_1$) and closing ($V_1$) and venting of the air within the space (S) is achieved by reversing valve positions ($H_1$) and ($V_1$) so air vents out of valve (V) in accordance with the arrow thereabove. This cycling occurs until the space (S) is filled with water and then pressuring of the water takes place so that the pressure gauge (P) registers the hydrostatic pressure on the circumferential weld seam (30) to test the integrity of the same.

Figure 6:
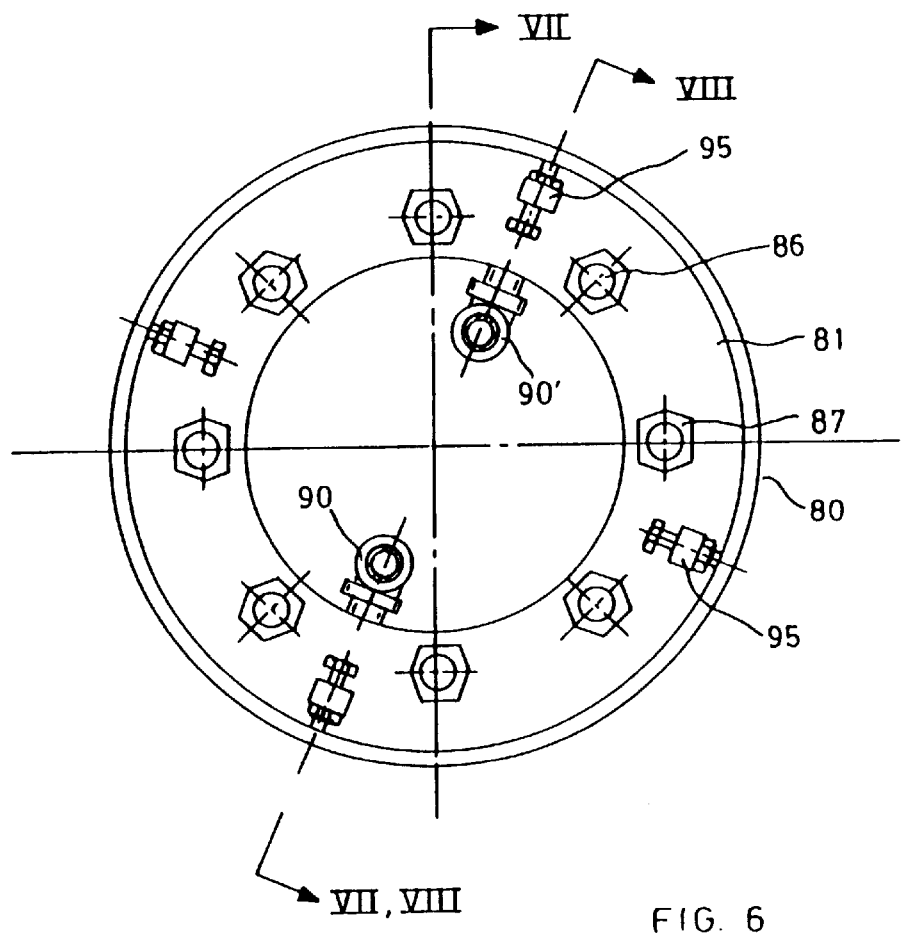
FIG. 6 is an end plan view of yet a third embodiment of test plug, allowing a central cavity through the plug and particularly adapted to test pipes of internal diameters of 8" or more.
Figure 7:
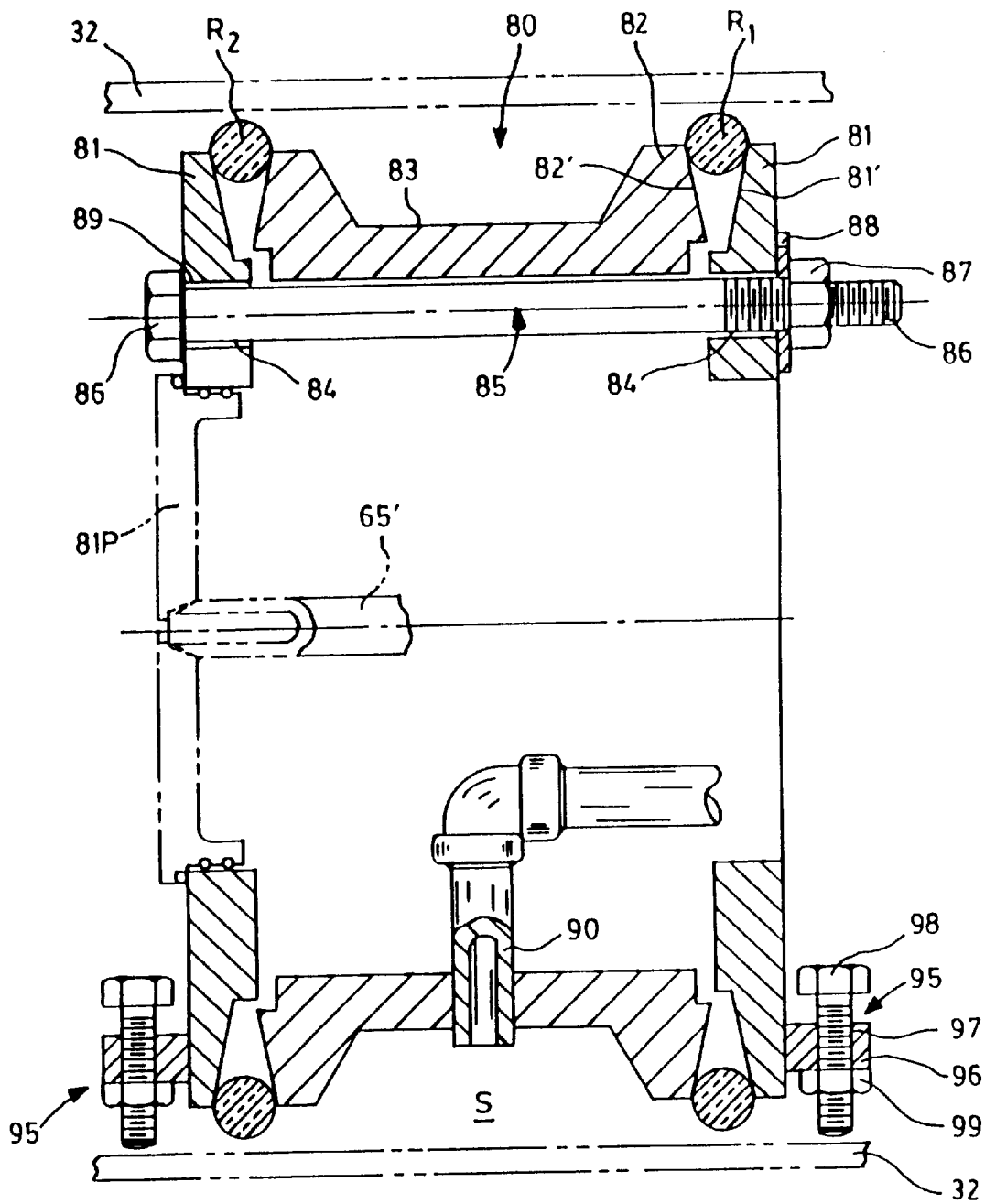
FIG. 7 is an axial section along lines VII—VII of FIG. 6.

Referring FIGS. 6 and 7 and to the third embodiment of the invention, the same consists of an annular plug (80) consisting of mirror end annular bosses or plates (81) and an annulus (82) with an outer circumferential race (83). The juxtaposed faces of the annular plates (81) and the annulus (82) are respectively bevelled at (81') and (82'), as shown, so as to accommodate the seating of "O" rings ($R_1$) and ($R_2$) therebetween. Each of the annular disks (81) have a plurality of apertures (84) therethrough circumferentially disposed so as to permit the passage therethrough of a nut-bolt arrangement, generally shown as (85) consisting of a bolt head (86) which is welded at (89) to the exterior face of one of the annular disks (81), the opposite end of the bolts (85) having a threaded shaft portion (86) accommodating a nut (87) which can be turned down onto an underlying washer (88). The annulus (82) may have appropriate diameters, as may the disks (81) to accommodate internal pipe (32) diameters over 8", as may be required.

The annulus (82) defines a filling and pressure channel (90) which communicates through the annulus (82) to the outside annular race (83), and diametrically opposite thereto a venting channel (90'). The plug (80) can be inserted into large diameter pipes exceeding 8", the bolts (87) tied down so as to force "O" rings ($R_1$) and ($R_2$) against the inner diameter of the pipe-flange interface to be tested. Liquid media is channelled into the space (S) defined by the race (83) and the inner wall of the pipe flange interface while venting of any air exits the diametrically disposed venting channel (90"). Testing of the interface in a similar fashion occurs.

Because of the great weight of the annular plug (80), particularly when made of steel, or steel alloys such as stainless steel, each annular plate (81) has four adjusting heads (95) diametrically paired and consisting of a protruding butt (96) having a threaded bore (97) accommodating a threaded bolt (98) which extends therethrough and whose distal end is adapted to turn against the internal diameter of the pipe (32), to locate the plug (80) co-axial with the pipe (32). Locking nuts may then be turned down to lock each bolt (98), as shown in phantom in FIG. 7, against the internal diameter of the pipe (32) that is being tested. Thereafter, flange nuts (87) are turned down to apply the pressure on the "O" rings ($R_1$) and ($R_2$) sealing them against the inner walls of the pipe flange interface so that the annular space (S) is a sealed plenum. Hydrostatic filling of the space (S) occurs as above noted, and pressure venting in the fashion, as earlier described, can take place. It is convenient to make the annulus (20), (60), (82) from aluminum in order to reduce its weight, and in certain applications even the bosses (13), (26), (46), (47), (81) may be made from appropriate aluminum stock but in some applications, particularly in the cereal industry, the whole plug will have to be made from stainless steel in order to meed health standards.

Figure 8:
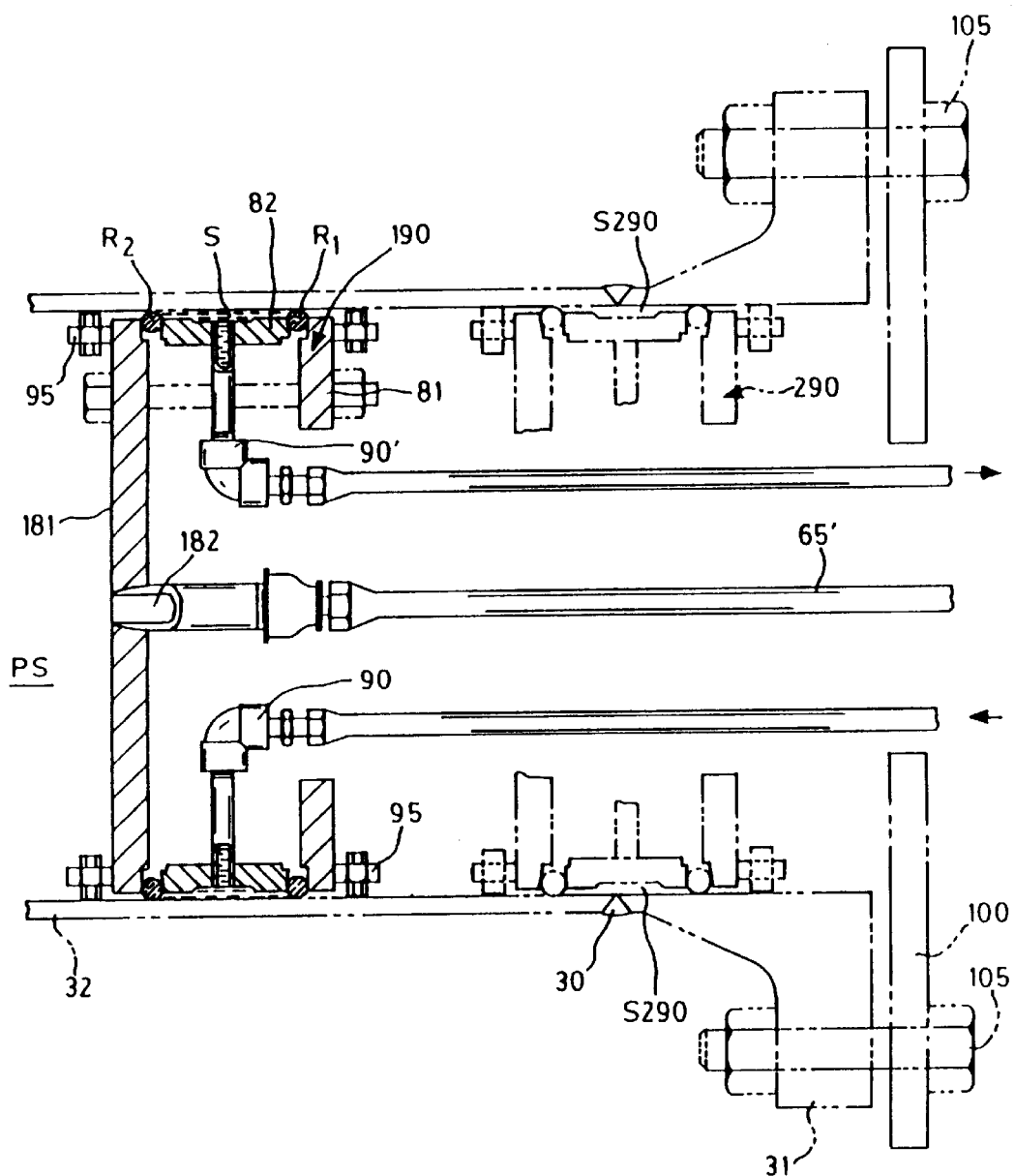
FIG. 8 is a diametrical crosssection of another embodiment of test plug, wherein one annular boss substantially occupies the total internal diameter of the plug, and hence is a disk while providing an aperture therethrough communicating to a channel therewith for pressure or content monitoring of internal pipe space, the opposite boss being an annulus.

Referring now to yet a further embodiment and to FIGS. 8 and BA, a test plug (190) also acts as an isolation and pipe space monitoring plug, and has an annular boss flange (81) and an opposite (annular) flange (181) in the form of a disk defining a central axial aperture (182) therethrough which communicates to a monitoring conduit reference (65') and into the internal pipe space diameter, referenced (PS), of the pipe (32) to the left of the flange (181) which can be perceived to be a long continuous pipe space of a fluid conveying conduit in an existing installation to which it is now desired that there be affixed onto the end of the pipe (32), a flange shown in phantom as (31). Thus, particularly in instances where the pipe space (PS) is part of a conduit, in a petrochemical plant, it must first be drained of contents; nevertheless, there are residual airborne hydrocarbons in the pipe space (PS) and also embedded into the inner surface walls of the pipe space (PS). When welding to such existing pipe space (PS), present safety standards require that the pipe space (SP) walls first be cleaned; this is expensive. With the isolation test plug configuration (190), this is not necessary.

The test plug (190) has the two O rings (R1) and R2) which are urged respectively against boss (81) and annulus (82) on the one hand, and disk (181) and the opposite end of annulus (82) to urge the O rings (R1, R$_2$) against the inner walls of the pipe that is now defined as the plenum space (S). Cooling water may be inserted into the pipe space (S) by flowing water through conduit (90) into the plenum space (S) to outflow from conduit (90'). When cold water is used, the temperature of the pipe to the left of the plug (190) maintains the pipe at a non-flammable temperature for the hydrocarbons that may reside in the pipe space (PS). Either a gas monitor, not shown, or other temperature sensitive device may be pushed into from right to left, the testing circuit conduit (651) through the conduit (182) into the pipe space (PS) for monitoring while welding of the weld (30) takes place.

After welding, another plug (290), similar to that of (190) is positioned, as shown in phantom, on the inside surface of the pipe (32) and the integrity of the weld (30) tested by applying appropriate fluid pressures to the space, referenced (S290), defined by the O rings (R1) and (R2), the annulus (82), and the internal diameter of the interface of the pipe (32), weld (30) and flange (31). Throughout this testing the other isolation test plug (190) can be left in position, once the integrity of the weld (30) has been assured, in some instances, it is also necessary to stress-relieve the weld (30). This is accomplished by applying an annular stress-relieving heater, referenced (500) over the weld (30); the heater has an overcovering insulation (505). The pipe-weld-flange interface (30, 31, 32) is brought up to the annealing temperature while water is still flowed into channel (90) and out channel (90') for plug (190), keeping cool that pipe juxtaposed to the water-filled plenum (S) and maintaining a cool temperature of the pipe to the left thereof and particularly, to the pipe space (PS). It has been found that the width of the plug between bosses (81) or between boss (81) and the disk boss (181) is preferably about 611 and the position of the plug (190) from the weld (30) should be at least, for safety purposes, about 21. In petrochemical applications, the distal end of the conduit (651) which actually allows venting and monitoring of the pipe space (PS) is open ended and should be at least 35' or more away from the physical location of the plug (190). The cooling waterflow through the circuit (90), (S), (90') should be at a positive pressure of around 100 PSIG.

Figure 8A:
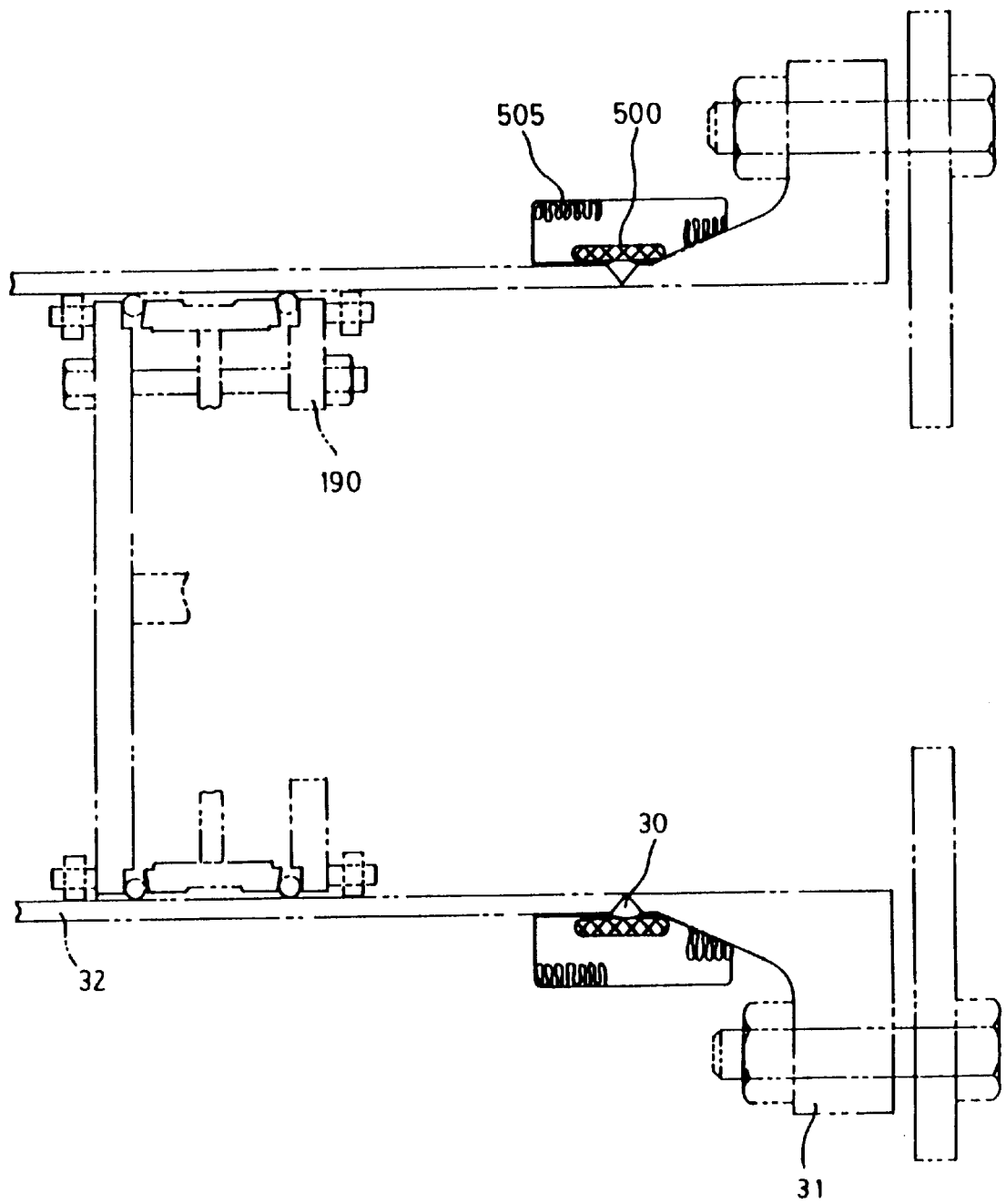
FIG. 8A is a section of the flangeweld-pipe interface of FIG. 8B but illustrating an annealing step to anneal the weld, the test plug shown in phantom.
Figure 8B:
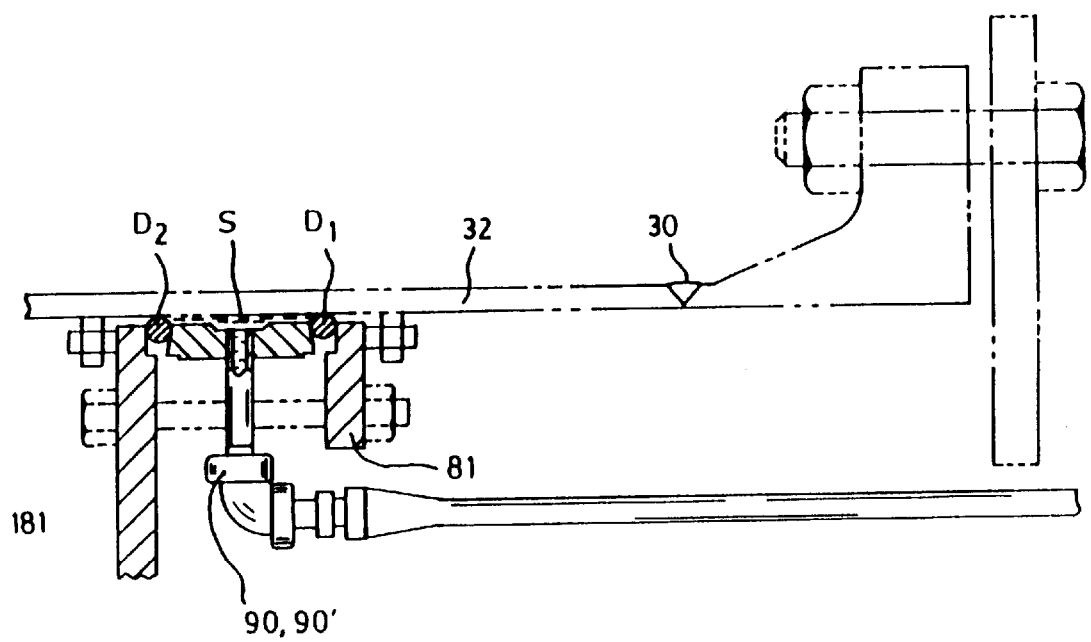

The operational sequence placing a flange, phantom flange (31), in FIGS. 8 and 8A, would be as follows. Drain the pipe (32) and pipe space (PS) of all hydrocarbon liquids and then place the plug (190) into place in a fashion, as earlier described and then inflow water into the annular space (S) by flowing water into conduit (90) and out of conduit (90'). The monitoring pipe or tube (65') extends at least 35 t away from site of the flange (190) and monitors, the temperature and volatiles within the pipe space (PS), (the monitoring devices not being shown).

The flange 31 is then welded by weld (30) to the end of the pipe (32) after the pipe end has been appropriately dressed. Leaving the plug (190) in place, a second plug (290), similarly configured, is positioned on the inside surface of the weld to define a testing plenum (S290) which is flooded with water in a similar fashion to that of plug (190) thereupon the integrity of the flange-weld-pipe interface is determined. Thereafter, the second test plug (290) is removed and the weld (30) stress relieved, as follows. Now referring to FIG. 8, the test plug (190) is still left in place and the water continues to flow into and out of the space (S) via the respective pipes (90) and (90'). An annular heater (500) is placed on the outside circumference of the weld (30) and an overcovering annular insulating sleeve (505) is placed thereover and the weld (30) brought up to its annealing temperature in order to stress-relieve the pipe-weld flange interface. After the annealing step, the annular heater (500) and insulating annulus (505) are removed; the weld allowed to become cool and then at a time convenient, the plug (190) can be disassembled.

Figure 9:
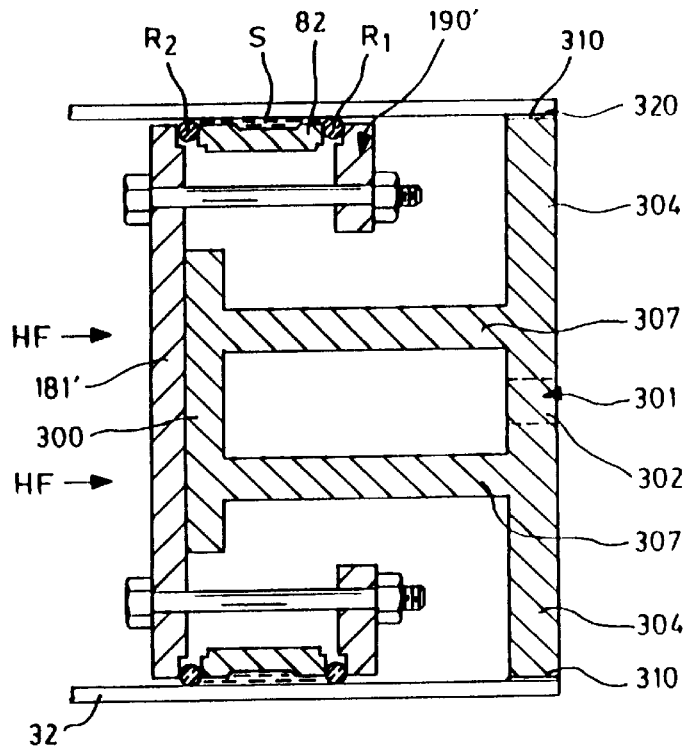
FIG. 9 is a diametrical crosssection, along lines IX—IX of FIG. 10, of yet a further embodiment of the test plug of FIG. 8 wherein the disk boss has no aperture and is supported by a brace structure that is particularly suitable for large internal diameter pipes, say 54" (135 cm) or more of internal diameter.
Figure 10:
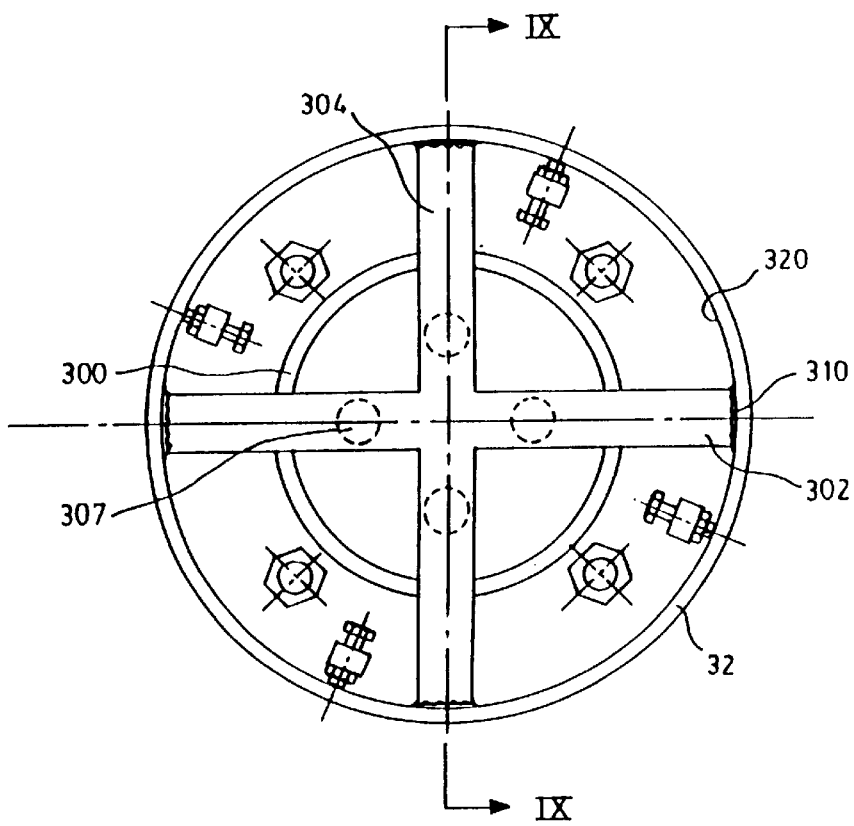
FIG. 10 is an end plan view, installed, of the test plug of FIG. 9.

Referring now to FIGS. 9 and 10, and yet a further embodiment of test plug, the same is generally indicated as (190'), all other reference numbers being the same as those of the embodiments of FIG. 8 and Figure SA. The disk boss (181) is replaced with a solid disk boss (181') and when the diameter of the internal pipe space is greater than say, approximately 54" (greater than about 137 cm), great pressure against the disk boss (181') will cause it to bulge. Thus, there is required the use of a support disk (300) and a support base structure (301) featuring two orthogonally oriented, radially disposed cross bars (302) and (304), the distal ends of which are welded at (310) to the internal diameter of the pipe (32) and defined by an annular extended pipe segment (320) which, after use, can be cut off as will be described. Alternatively, not shown, the cross arms can be welded to the pipe distal end. Each cross arm (302) and (304) has axially oriented support elements (307), which extend to and are secured to support disk (300), preferably as shown in FIGS. 9 and 10 as being integral. The support structure (301) provides support by its abutting disk (300) being flush with the obverse side of the disk boss (181') preventing bulging of the disk boss (181'). The test plug (190') is assembled and mounted into the internal space (PS) of the pipe (32), as shown, and water is flowed into the annular space (S) through communicating channels, not referenced but now to be understood as being similar to channels (90) and (90'), shown in FIG. 8.

If the pipe (32) is extremely long, say 100 meters or more, the whole pipe (32) to the left of the test plug (190'), pipe space (PS), can be tested by causing a high pressure, referenced (HF) (high force) to be exerted in the direction of the two arrows onto the boss (181') face; bowing of the disk (181') is inhibited by the disk (300) and the support structure (301). After the pipe space (PS) integrity has been "tested", the support structure (301) can be cut away from the pipe (32) as by an acetylene torch or the like; the support structure (301) is removed; then, the test plug (190') can be disassembled in a manner as earlier described or if required, the pipe end that has been severed can be now dressed, flanged as by welding, as here and described. The pipe-weld-flange interface can then be tested by relocating test plug (190') in juxtaposition with the interface in the fashion as earlier described.

Figure 11:
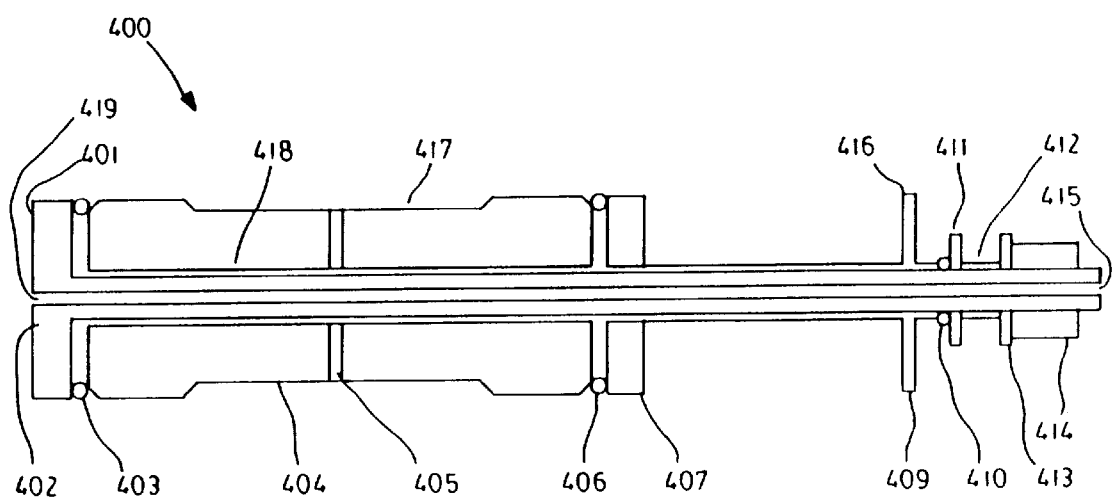
FIG. 11 is cross sectional view of a single bolt tool

FIG. 11 illustrates, a further embodiment of the invention is a single bolt tool that may be used for ¾ to 4 inch diameter pipes is shown. The tool is generally shown at 400 comprising a center shaft 402 that has a first end, a threaded second end and a through bore 418. The center shaft 402 is fixed to a disk shaped back plate 401 through a hole 419 located at the center of the back plate 401 so that the hole 419 and the bore 418 are coaxial. The outer diameter of the first end of the center shaft 402 fits tightly into the hole 419 and the center shaft 402 extends generally normal from the center of the back plate 401. In the preferred embodiment, back plate 401 and center shaft 402 comprise a unitary structure.

A cylinder 404 is slidably mounted on the center shaft 402 so that there is a clearance between the cylinder 404 and the center shaft 402. The cylinder 404 includes a recess channel 417 that is continuous about the perimeter of the cylinder 404. A cavity is created between the pipe and the recess channel 417. At least one channel 405 extends from the recess channel 417 to the clearance region between the cylinder 404 and the center shaft 402.

A seal 403 is located between the back plate 401 and the cylinder 404 and a seal 406 is located between the cylinder and a front plate 407. Seals 403 and 406 preferably comprise o-rings.

A bore extends through the front plate 407 and the sleeve 408. The front plate 407 and sleeve 408 are mounted coaxially on the center shaft 402. The front plate 407 comprises a first end adjacent to seal 406 and a second end attached to a sleeve 408. A clearance exists between the inner diameters of the front plate 407 and sleeve 408 and the outer diameter of the shaft 402. Sleeve 408 includes an inlet 409 and an outlet 416 located toward the second end of the center shaft 402. In the preferred embodiment, front plate 407 and sleeve 408 comprise a unitary structure.

Following the sleeve 408, and moving in the direction of the second end of the center shaft 402, a seal 410 is followed by a compression washer 411, a compression sleeve 412, a slip washer 413, and finally a nut 414. The threaded second end of the center shaft 402 protrudes from the nut 414.

In operation, the tool 400 is placed inside a pipe at a desired location. The nut 414 is then tightened on the center shaft 402 in order to force all of the components to be tightly sandwiched together between the nut 414 and the back plate 401. As the back plate 401 and front plate 407 are compressed together, the seals 403 and 406 on either side of the cylinder 404 are forced outward to meet the inner diameter of the pipe. This creates the cavity between the inside of the pipe and the cylinder 404. A medium such as water is then fed into the inlet 409. The cavity is bled until there is no air remaining in the cavity. If a hydrostatic operation is being performed, the water will be held in the cavity and pressurized. In a hydrodynamic operation, the water will be continuously fed into the inlet 409 and forced out of the outlet 416.

Figure 12:
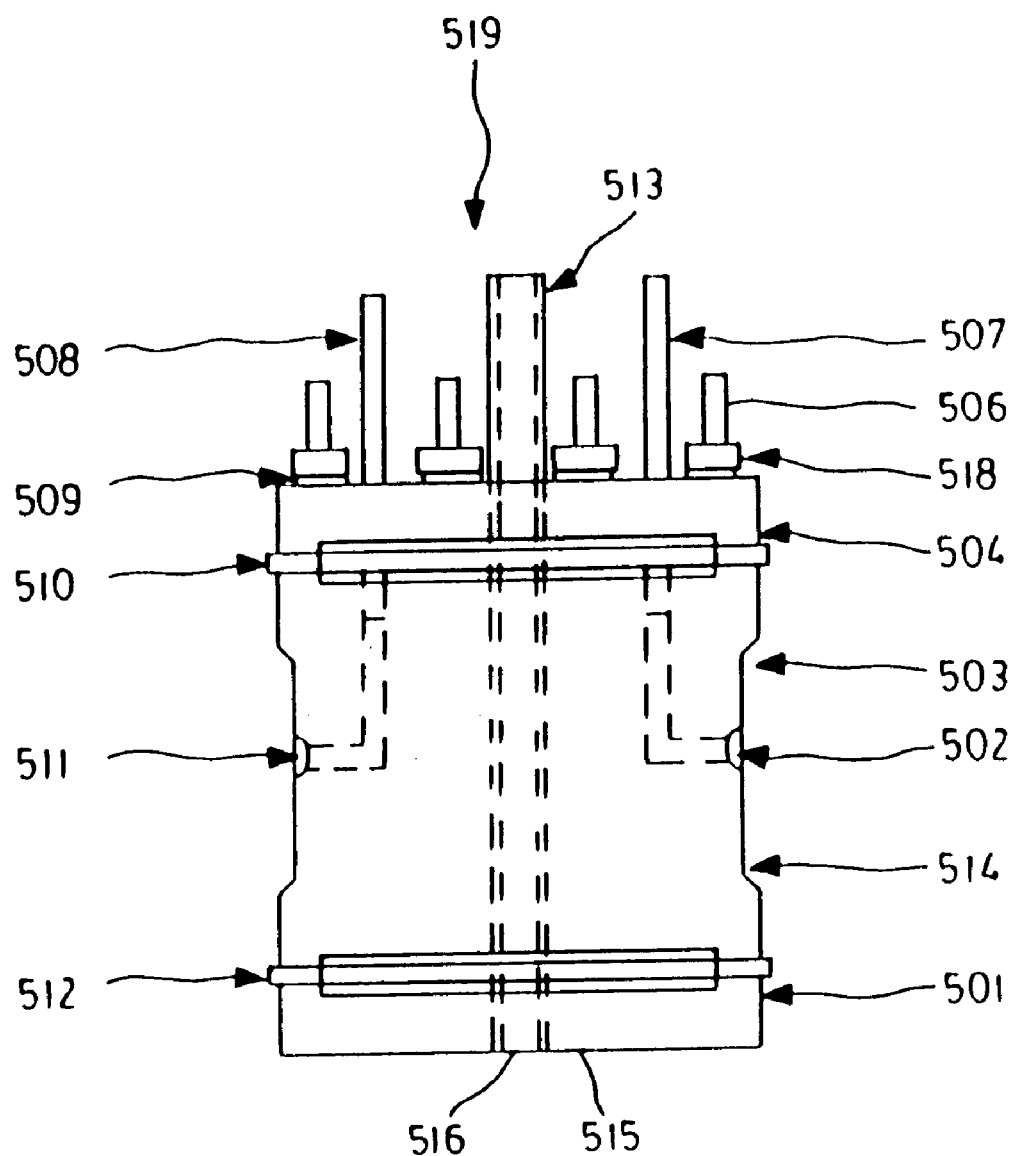
FIG. 12 is a side view of a multi bolt tool

Referring to FIG. 12, a further embodiment of the tool that may be used for pipes with diameters between 4 and 8 inches is shown.

A tool is generally shown at 519 comprising vent pipe 513 that has a first end, a second end and a through bore 515. The vent pipe 513 is fixed to a back plate 501 through a hole 516 located at the center of the back plate 501 so that the hole 516 and the bore 515 are coaxial. The outer diameter of the first end of the vent pipe 513 fits tightly into the hole 516 and the vent pipe 513 extends generally normal from the center of the back plate 501.

In one embodiment, a cylinder 503 has a recess channel 514 continuous about its perimeter, and is mounted coaxial on the vent pipe 513 adjacent to the back plate 501. A cavity is created between the pipe and the recess channel 514. The cylinder 503 includes a fill port 502 and a vent port 511 that are connected to an inlet 507 and an outlet 508 respectively. The inlet 507 and the outlet 508 communicate with the recess channel 514. In another embodiment, the recess channel 514 may be omitted while maintaining the inlet 507 and outlet 508.

A back seal 512 is located between the cylinder 503 and the back plate 501. A front seal 510 is located between the cylinder 503 and a front plate 504.

The front plate 504 is mounted slidably coaxial on the vent pipe 513.

Compression washers 509 are located between the front plate 504 and nuts 518. Bolts 506 extend through the tool assembly 519 to fasten the components together.

In operation, the tool 519 is placed inside a pipe at a desired location. The nuts 518 are tightened in order to force all of the components to be tightly sandwiched together between the nuts 518 and the back plate 501. As the back plate 501 and front plate 507 are compressed together, the seals 510 and 512 on either side of the cylinder 503 are forced outward to meet the inner diameter of the pipe. This creates the cavity between the inside of the pipe and the cylinder 503. A medium such as water is then fed into the inlet 507. The cavity is bled until there is no air remaining in the cavity. If a hydrostatic operation is being performed, the water will be held in the cavity and pressurized. In a hydrodynamic operation, the water will be continuously fed into the inlet 409 and forced out of the outlet 508.

Figure 14A:
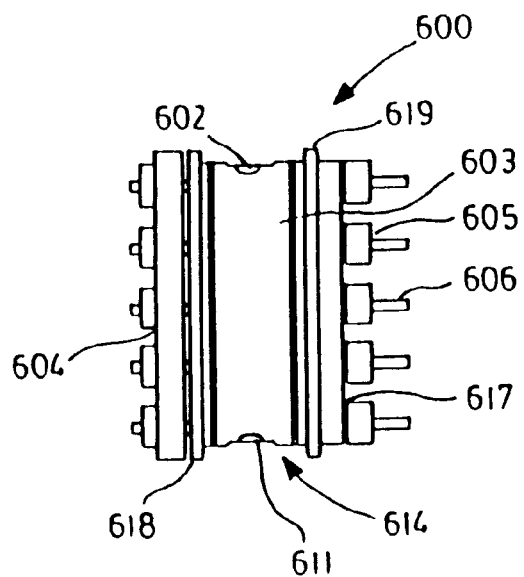
FIG. 14*a* is a side view of a multi bolt tool
Figure 14B:
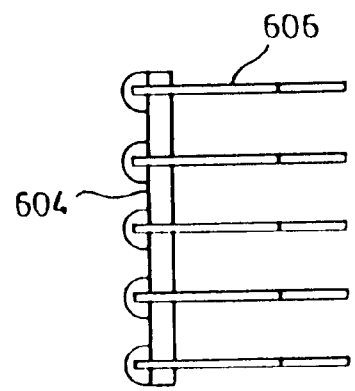
FIG. 14*b* shows portions of FIG. 14*a*

Referring to FIG. 14a, a further embodiment of a tool suitable for use in pipes with diameters of 8 inches upwards is generally shown at 600.

Figure 14C:
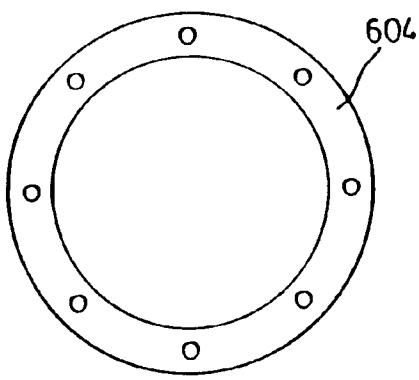
FIG. 14*c* is a front view of portions of FIG. 14*a*
Figure 14D:
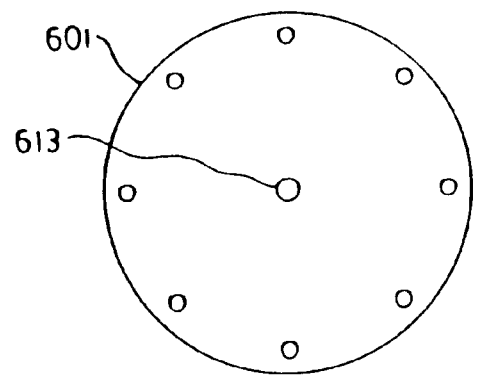
FIG. 14*d* is a rear view of portions of FIG. 14*a*

A front ring 604, shown in FIG. 14c, sandwiches a cylinder 603 between itself and a solid back plate 601, shown in FIG. 14d.

The cylinder 603 is hollow and includes a recess channel 614, a fill port 602 and a vent port 611. The fill port 602 and the vent port 611 are in communication with the recess channel 614. A cavity is created between the pipe and the recess channel 614. The ports 602 and 611 are connected to pipes that act as inlets and outlets respectively.

A back seal 618 is located between the cylinder 603 and the back plate 601. A front seal 619 is located between the cylinder 603 and a front ring 604.

Figure 13A:
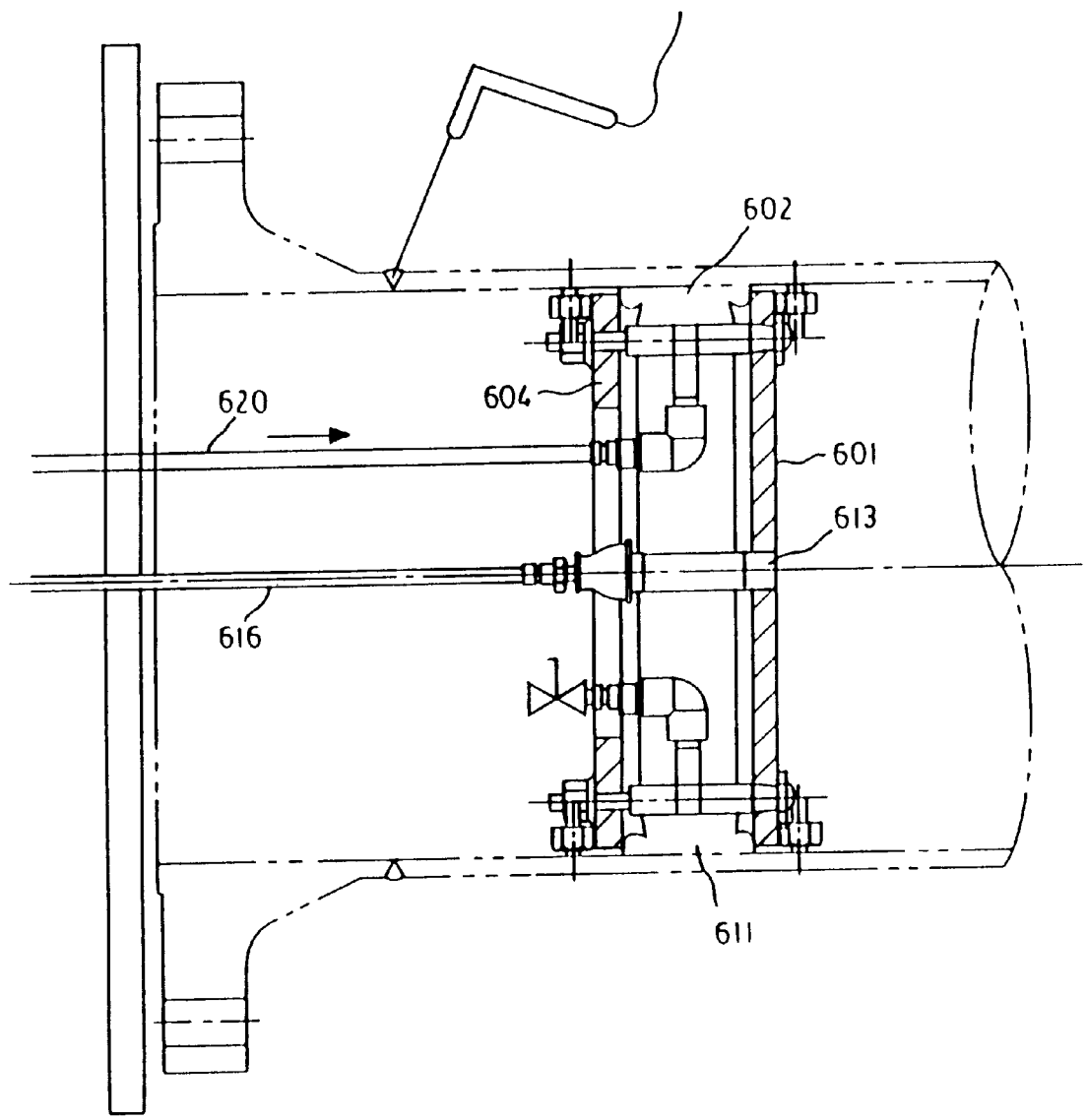
FIG. 13*a* is a cross sectional view of a multi bolt tool in a pipe in a hydrostatic application.
Figure 13B:
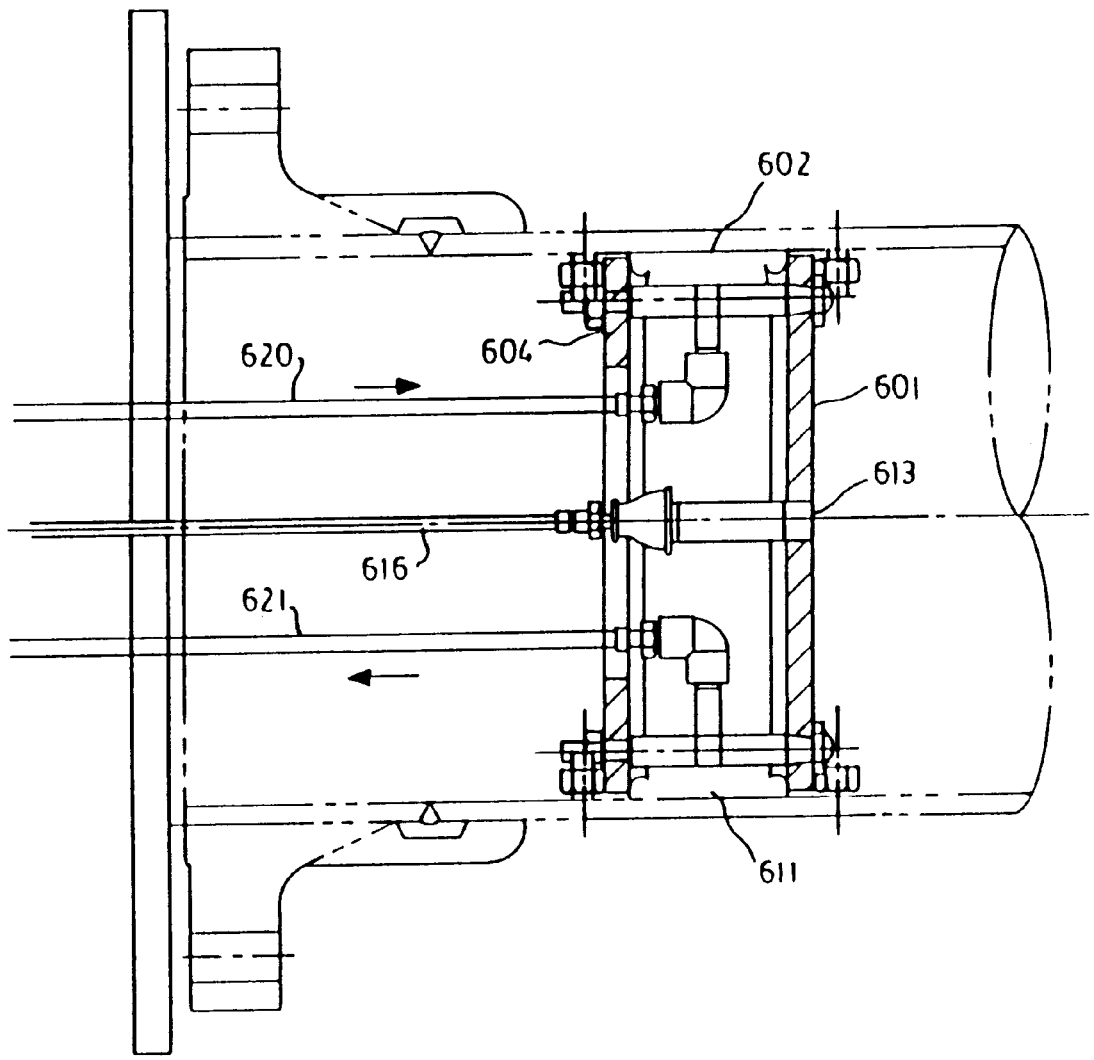
FIG. 13*b* is a cross sectional view of a multi bolt tool in a pipe in a hydrodymanic application.

Referring to FIG. 14d, a back plate 601 is solid and has a vent port 613 that is connected to a vent pipe 616, shown in FIGS. 13a and 13b.

The tool assembly 600 is fastened together with nuts 605 and bolts 606 with washers 617 between the nuts and the front ring 604.

In operation, the tool 600 is placed inside a pipe at a desired location. The nuts 605 are tightened in order to force all of the components to be tightly sandwiched together between the nuts 605 and the back plate 601. As the back plate 601 and front ring 604 are compressed together, the seals 618 and 619 on either side of the cylinder 603 are forced outward to meet the inner diameter of the pipe. This creates the cavity between the inside of the pipe and the cylinder 603. A medium such as water is then fed into the inlet 620. The cavity is bled until there is no air remaining in the cavity. If a hydrostatic operation is being performed, the water will be held in the cavity and pressurized. In a hydrodynamic operation, the water will be continuously fed into the inlet 620 and forced out of the outlet 621.

A vent is present in the embodiments of FIGS. 11, 12, and 14*a*. The purpose of the vent is to prevent pressure build up behind the tool by allowing some fluid from the pipe to escape. If it is required that no fluid escape for health and safety reasons, for example, a pressure gauge may be placed on the venting pipe. The pressure gauge serves two purposes, it blocks flow through the pipe and it allows an operator to monitor the pressure behind the tool.

The embodiments of FIGS. 11, 12, and 14*a* can be used for hydrostatic or hydrodynamic applications. Referring to FIGS. 13*a* and 13*b,* the tool 600 of FIG. 14*a* is shown in detail. FIG. 13*a* shows a hydrostatic application of the tool 600. FIG. 13*b* shows a hydrodynamic application of the tool 600.

In the hydrostatic application, medium flows into the tool and is held there and pressurized. In the hydrodynamic application, water flows continuously through the tool at a predetermined pressure. The hydrodynamic application is used where excessive heat is being generated, for example when the tool is located next to a welding operation. Cold water may be fed through the tool or liquid nitrogen may be used for an increased cooling effect. Any other type of cooling fluid may also be used. If liquid nitrogen is used it may be necessary to use an insulating jacket around the pipe section where the tool is located.

The embodiments of the tool shown in FIGS. 11, 12 and 14*a* can be used for two different applications: weld testing and isolation. These two applications are described generally below.

Weld testing is performed using the following method in order to determine if there are any cracks in the weld. For weld testing, the tool is installed so that the weld being tested is centered between the two main seals. The seal adjacent to the back plate must be positioned 1.5 inches minimum behind the weld being tested. The inlet and outlet must be positioned at 12 and 6 o'clock in order to allow test medium to properly fill the tool cavity and bleed off air. For the multi bolt tool, a torque wrench is used to tighten the compression nuts to the specified pattern and values. For single bolt tools, the bolt is tightened using a crescent wrench. The bolt on this type of tool must always be accessible so proper positioning of the tool is critical. To fill the cavity of the tool, a hose should be connected to the inlet and filled until medium begins to seep out of the outlet. When this occurs, a hose should be attached to the outlet.

Isolation is used to stop flow through a pipe upstream of a location where work such as welding is to be performed. For isolation, the tool should be installed so that sufficient distance is maintained upstream from the work area. All isolation compression nuts need to be accessible after the work has been accomplished. The inlet and outlet must be positioned at 12 and 6 o'clock to allow medium to properly fill the tool cavity and bleed off air. For the multi bolt tool, a torque wrench is used to tighten the compression nuts to the specified pattern and values. For single bolt tools, the bolt is tightened using a crescent wrench. The bolt on this type of tool must always be accessible so proper positioning of the tool is critical. To fill the cavity of the tool, a hose should be connected to the inlet filled until medium begins to seep out of the outlet. When this occurs, a hose should be attached to the outlet. A pressure gauge is then installed and the tool is prepared for pressure application. The tool is then pressurized to specified values (150 lbs). During pressurization, a visual inspection for leakage around tool should be performed.

Although the invention has been described with reference to certain specific embodiments, various modifications thereof will be apparent to those skilled in the art without departing from the spirit and scope of the invention as outlined in the claims appended hereto.

What is claimed is:

1. An apparatus for isolating or testing an interior surface segment of a pipe having an internal diameter, said apparatus comprising:

a) an annular body with oppositely facing annular ends and defining, on its outer perimeter, a recess;

b) a pair of bosses, each of said bosses being located on opposite ends of said annular body and coaxial therewith;

c) a pair of resilient annular members adapted to be respectively and coaxially juxtaposed between each of said bosses and said annular faces;

d) means for urging the bosses respectively towards said annular body thereby deforming said resilient members in a radially outward direction against the internal surface of said pipe so as to form a seal there between, whereby a sealed annular space is defined between said recess on said annular body, the pipe internal surface and said resilient members;

e) a means for introducing a fluid into said annular space wherein said means for introducing a fluid comprises a first channel for introducing said fluid into the annular space and a second channel for evacuating air from the annular space or for allowing said fluid to circulate through the annular space thereby maintaining the annular space at a desired temperature;

f) a vent extending through said apparatus for providing communication between interior segments of said pipe on opposite ends of said assembly thereby preventing pressure accumulation within said pipe while said apparatus is in use;

wherein, said apparatus further includes a bolt extending through the annular body and the pair of bosses, said bolt having first and second ends, a first boss of said pair of bosses being secured to the first end of said bolt, and wherein said means for urging comprises a nut co-operating with the second end of said bolt.

2. A method of isolating or testing the interior surface of a segment of a pipe having an internal diameter, said method comprising the steps of:

1) positioning within said pipe, at said segment, the apparatus of claim 1;

2) urging said bosses towards said annular body, thereby creating said sealed annular space;

3) filling said annular space with a fluid, under pressure, through said means for introducing a fluid;

4) establishing a high pressure within said annular space.

3. The method of claim 2 wherein said fluid is introduced through said first channel and any air contained in the annular space is evacuated through said second channel.

4. The method of claim 3 wherein said fluid is circulated through said annular space thereby maintaining said space at a desired temperature.

5. The apparatus of claim 1 wherein said bolt extends generally coaxially through the annular body and said pair of bosses.

6. The apparatus of claim 5 wherein the vent comprises a bore extending through said bolt.

7. The apparatus of claim 6 wherein the annular body is slidably engaged on said bolt whereby a second annular space is created between said bolt and said annular body.

8. The apparatus of claim 7 wherein said first and second channels comprise openings extending through the radius of said annular body whereby said channels allow the second annular space to communicate with the sealed annular space.

9. The apparatus of claim 8 wherein the second boss of said pair of bosses includes a sleeve attached thereto, said sleeve extending over said bolt and away from said annular body.

10. The apparatus of claim 9 wherein said sleeve has a diameter greater than that of the bolt whereby the space between the sleeve and the bolt communicates with the second annular space, and wherein said sleeve includes first and second ports for introducing a fluid into said second annular space and for vacating said second annular space.

11. The apparatus of claim 10 wherein said nut bears against an end of said sleeve opposite to said second boss.

* * * * *